(12) United States Patent
Brissman et al.

(10) Patent No.: US 7,924,151 B2
(45) Date of Patent: Apr. 12, 2011

(54) FIELD DEVICE MANAGEMENT

(75) Inventors: Jan Brissman, Limhamn (SE); Christer Scheja, Lund (SE); Lars-Göran Hallgren, Malmö (SE)

(73) Assignee: Schneider Electric Buildings AB, Malmö (SE)

( * ) Notice: Subject to any disclaimer, the term of this patent is extended or adjusted under 35 U.S.C. 154(b) by 945 days.

(21) Appl. No.: 11/659,666

(22) PCT Filed: Aug. 10, 2005

(86) PCT No.: PCT/SE2005/001196
§ 371 (c)(1),
(2), (4) Date: Feb. 7, 2007

(87) PCT Pub. No.: WO2006/016845
PCT Pub. Date: Feb. 16, 2006

(65) Prior Publication Data
US 2009/0009298 A1    Jan. 8, 2009

Related U.S. Application Data

(60) Provisional application No. 60/599,873, filed on Aug. 10, 2004.

(30) Foreign Application Priority Data

Aug. 10, 2004  (SE) ..................................... 0401996

(51) Int. Cl.
*G08B 1/00* (2006.01)
*G08B 13/14* (2006.01)
*H04Q 5/22* (2006.01)
*G06Q 10/00* (2006.01)

(52) U.S. Cl. ............... 340/539.13; 340/10.1; 340/572.1; 705/28

(58) Field of Classification Search .................. 340/10.1, 340/572.1, 825.49, 539.13; 705/28; 707/3; 709/224
See application file for complete search history.

(56) References Cited

U.S. PATENT DOCUMENTS

| | | | |
|---|---|---|---|
| 6,552,663 B2 * | 4/2003 | Swartzel et al. | 340/572.1 |
| 6,988,079 B1 * | 1/2006 | Or-Bach et al. | 705/28 |
| 7,098,793 B2 * | 8/2006 | Chung | 340/572.1 |
| 7,471,201 B2 * | 12/2008 | Ono | 340/572.1 |
| 7,597,250 B2 * | 10/2009 | Finn | 235/380 |
| 2002/0198795 A1 | 12/2002 | Dorenbosch | |
| 2003/0050737 A1 | 3/2003 | Osann | |
| 2003/0137396 A1 | 7/2003 | Durej et al. | |

FOREIGN PATENT DOCUMENTS

EP    1 316 814 A1    6/2003

* cited by examiner

*Primary Examiner* — Daniel Wu
*Assistant Examiner* — Mark Rushing
(74) *Attorney, Agent, or Firm* — Buchanan Ingersoll & Rooney PC

(57) ABSTRACT

A system for facility management is disclosed, comprising a plurality of system devices each provided with an identity tag uniquely identifying the system device; a system layout database comprising facility layout data including intentional positions of the system devices; a system device database comprising data and identity for each system device; and an operator tool enabled to communicate with the system layout database and system device database, the operator tool being provided with a tag reader enabled to read an identity from the tags of the system devices when being in the vicinity of the system devices, wherein the operator tool is arranged to access data from the system device database about the system device and include said identity in an item of the system layout database. An operator tool and methods for managing the facility management system is also disclosed.

32 Claims, 6 Drawing Sheets

FIELD DEVICE MANAGEMENT

This is a 35 U.S.C. §371 filing of International Application No. PCT/SE2005/001196, filed Aug. 10, 2005, and the benefit is claimed under 35 U.S.C. §119(e) of U.S. Provisional Patent Application No. 60/599,873, filed Aug. 10, 2004, and under 35 U.S.C. §§119(a)-(d) of Swedish Application No. 0401996-4, filed Aug. 10, 2004.

FIELD OF INVENTION

The present invention relates to a system for facility management, an operator tool for facility management, and a method of managing the system.

BACKGROUND OF THE INVENTION

Facility management is normally meant to ensure functionality of a built environment by integrating people, place, process and technology. Facilities, like a modern building or larger vessel, normally comprises one or more advanced systems for management of different features, e.g. heating, ventilating and air conditioning (HVAC) system, access system, lighting system, burglar alarm system, fire alarm system, or other systems for implementing a function in a facility. A modern HVAC system normally comprises a plurality of sensors, actuators, controllers, valves, power sources, etc. An access system comprises controlled door locks, card readers, one or more control devices with access databases for different areas, etc. Burglar and fire alarm systems comprises a plurality of sensors, control devices and user interfaces. These parts are connected to each other in a complex configuration. It is highly important that the right devices are connected to the right system, and in a correct way, to enable operation in the way the systems are intended. This configuration is designed prior installation, and may be re-designed at updates or extensions of the system. Further, the systems often have supervising means, which is a useful tool for a real estate manager for improving environment, safety, and economy.

During installation, start-up, maintenance, or modification of the system, there are different ways to ensure and follow-up correct configuration of the complex system. One way is to manually check the installation. Another way, as is described in US 2003/0050737 A1, is to use a positioning system for identifying the location of each device, as is performed for energy monitoring and control (EMAC) points in US 2003/0050737 A1. Here, a portable EMAC identification unit is used for receiving signals from multiple transmission beacons to determine the location of the portable EMAC identification unit through triangulation. This can be performed by a processing means in the EMAC identification unit, or by processing means in the beacons, if the EMAC identification unit echoes the beacon signals back to the beacons. The EMAC identification unit can then identify EMAC point locations by plugging into a power plug, or placing the EMAC identification unit adjacent to a power consuming switch or a device with a dedicated wiring, and indicating the located device by an input on a keypad or keyboard. Each EMAC may have an integral serial number that can be used as part of the identification process. The position of the EMAC point can then be determined in two or three dimensions.

However, there are still a few problems remaining for a satisfactory management of the devices of the HVAC system. The devices of the HVAC system may not always be easily physically accessible. For example, they might be placed behind a lacunaria, i.e. in the plenum. Another problem is that a plurality of devices may be placed close to each other, that it may be difficult to distinguish which device has which function, or the type of device. Further, in a fairly complex system, which is the case, a plurality of different devices must be managed. United States patent application with publication no. US 2003/0137396 A1 discloses a system where HVAC network devices are provided with radio frequency identification (RFID) tags which can be read by a read/write device. The read/write device will be used by a person to assign network addresses to each network device. The person will use information concerning the location of an HVAC network device to determine the network address that is to be assigned to the network device. The identified network address along with the tag identification is transmitted to a network controller for the communication network. The network controller will then transmit a configuration message over the communication bus, that will include the tag identification and the desired network address. The HVAC network device having the matching tag identification will respond to the configuration message from the network controller to allow the desired network address to be downloaded to the particular HVAC network device.

Still a problem is that the operator of the facility, when working in the field with an operator tool, have to consult floor plan and wiring schemes, handbooks, data sheets, etc. to be able to perform her task. Further, a problem is that the network devices have to be power supplied and connected to the system, which have to be up and running, to be able to manage the system according to the prior art. This is especially crucial when installing a new system or when troubleshooting a system that is down.

SUMMARY OF THE INVENTION

It is therefore an object of the present invention to overcome the above problems, or at least to provide an improved management of the devices of a management system for a facility.

The above object is obtained according to a first aspect of the present invention by a system for facility management, comprising: a plurality of system devices each provided with an identity tag uniquely identifying the system device; a system layout database comprising facility layout data including intentional positions of the system devices; a system device database comprising, for each of said system devices, data and identity; and an operator tool enabled to communicate with the system layout database and said system device database, the operator tool being provided with a tag reader enabled to read an identity from a tag of a system device when being in the vicinity of the system device, wherein the operator tool is arranged to access data from the system device database about the system device and include the identity in an item of the system layout database, the item being related to the system device.

An effect is an updated system layout database that contain information about the actual system devices in the system, and the operator can access data about the system device, thus the operator of the system will experience facilitated management of the system.

An advantage of this is that it implies improved quality of the system.

The system layout database may be enabled to communicate with the device database.

An effect is improved information handling on the system, which implies a survey of the devices in the system.

An advantage of this is better knowledge of the devices of the system.

The identity tag may comprise a transponder for wireless communication with the tag reader of the operator tool.

An effect is that system devices can be accessed for identification from a distance, both when on-line and off-line with the rest of the system.

An advantage of this is, since devices can be identified without physical contact, that an operator can identify devices placed where the operator can not easily reach them.

The system may further comprise means for determining actual positions of the system devices for updating the system layout database. At least one of said tags may be a radio frequency identification (RFID) transponder. The RFID transponder may be re-programmable. The RFID transponder may be an active or a passive transponder. At least one of said tags may be a Bluetooth device, an optical tranceiver, an infrared data association (IRDA) device, an infra red communications device, a light scanned device, a bar code, a magnetic device, or an acoustic device, or any combination thereof.

The above object is obtained according to a second aspect of the present invention by an operator tool comprising: a communication interface for communication with a system layout database of a system for facility management and a system device database; a tag reader for reading a tag of a system device; and a processing unit connected to the communication interface and the tag reader for processing items received via the communication interface in response to information received by the tag reader.

An effect is that identification of system devices can be performed.

An advantage of this is improved management of a system.

The tag reader may be a scanner for a radio frequency identification (RFID) transponder.

An effect is that identification of system devices can be performed from a distance.

An advantage of this is that an operator can identify devices placed where the operator can not easily reach them.

The scanner may be enabled to write information to a RFID transponder.

An effect is that further information can be provided in the tags.

An advantage of this is further improved management of the system, e.g. for service of the system devices.

The above object is obtained according to a third aspect of the present invention by a method for managing a facility management system for locating a system device, comprising the steps of: accessing a database item from a system device database, said item comprising data and identity of a system device; and locating said system device, comprising the steps of: sending a signal from an operator tool to a system device; receiving an echo from said system device, wherein said echo comprises a unique identity of said system device; and checking if said received identity is equal to said identity from said database item.

The method may further comprise the step of accessing an item from a system layout database to said operator tool, wherein the item of the system layout database comprises location information on the system device.

The method may further comprise the steps of: mapping the identity to a first database item of a system layout database; and updating the first database item to include the identity.

The updating may further comprise including said data from said system device database.

The method may further comprise presenting the data to a user identity.

The above object is obtained according to a fourth aspect of the present invention by a method for managing a facility management system, comprising the steps of: sending a signal from an operator tool to a system device; receiving an echo from the system device, wherein the echo comprises a unique identity of the system device; accessing a database item from a system device database, the item comprising data and identity of the system device; mapping the identity to a first database item of a system layout database; and updating the first database item to include the identity.

An effect is provision of identification of the system devices.

An advantage of this is improved management of the system.

The updating may further comprise including the data from the system device database.

The method may further comprise the step of downloading an item from a system layout database to the operator tool, wherein the item of the system layout database comprises the first database item.

An effect is that the relevant information from the system layout database is provided to an operator on the field.

An advantage of this is that layout information is provided to the operator on the field and that the information can be updated with actual data from the system device.

The method may further comprise the steps of: communicating the updated first item to the system layout database; creating a logical connection between the item of the layout database and an item of a system device database corresponding to the unique identity of the system device; and adding information from the item of the system device database to the item of the system layout database.

An effect is a survey of the devices in the system.

An advantage of this is better knowledge of the devices of the system.

The method may further comprise the step of presenting the data to a user.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, wherein.

DETAILED DESCRIPTION OF PREFERRED EMBODIMENTS

Figure 1:
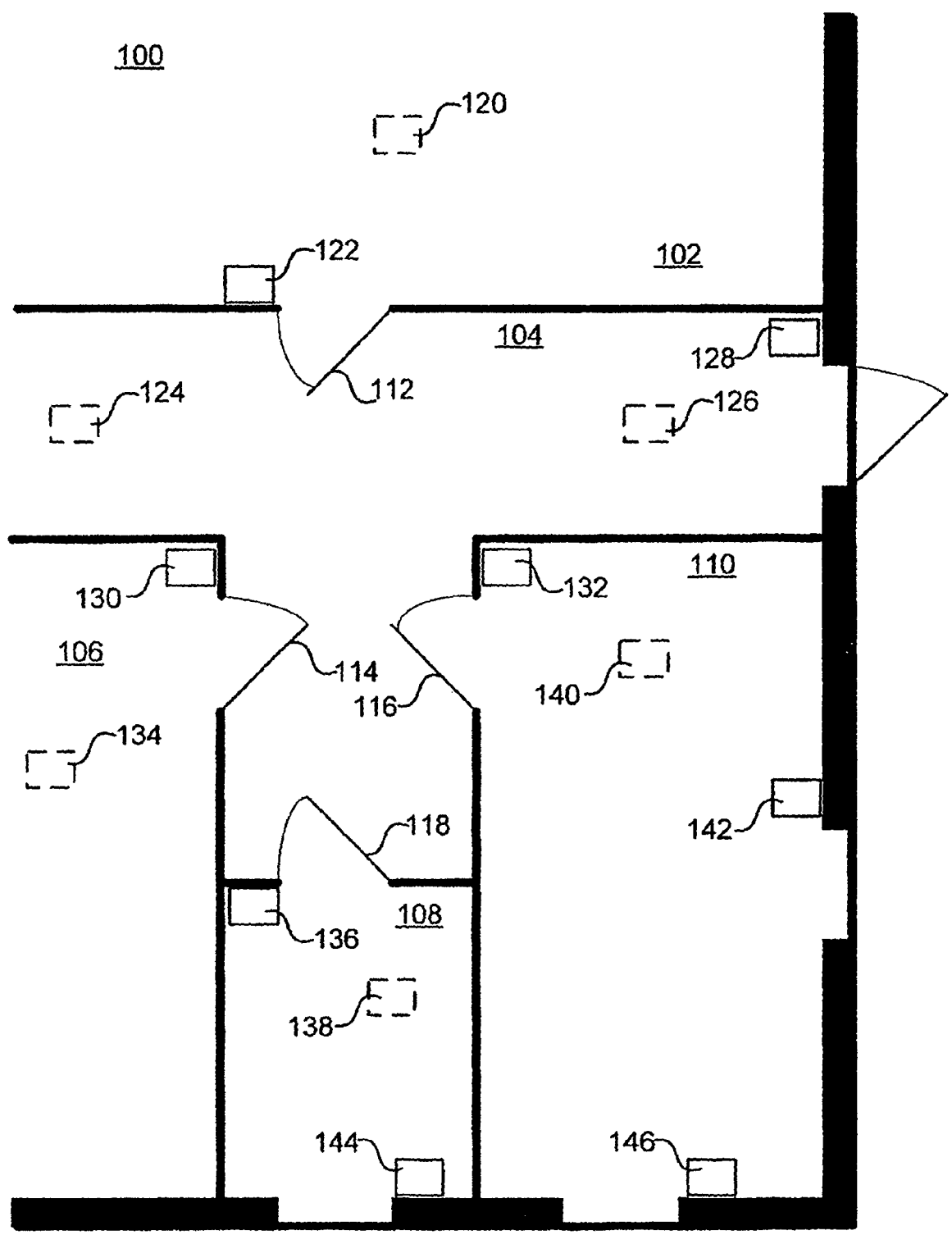
FIG. 1 shows an illustrative example of a floor plan with depicted system devices.

FIG. 1 shows as an illustrative example a floor plan of a part of a building 100. It could as well be a part of a floor plan of a part of a vessel, e.g. a passenger liner. The floor plan shows a plurality of rooms 102, 104, 106, 108, 110 and doors 112, 114, 116, 118 for enabling passage between the rooms 102, 104, 106, 108, 110. FIG. 1 also shows schematically a plurality of system devices 120, 122, 124, 126, 128, 130, 132, 134, 136, 138, 140, 142, 144, 146 for a facility management system, e.g. for heating, ventilating and air conditioning (HVAC), for lighting, etc. The system devices 120, 122, 124, 126, 128, 130, 132, 134, 136, 138, 140, 142, 144, 146 for the system could be sensors, actuators, controllers, valves, power sources, etc. connected to each other in a complex configuration (not shown in FIG. 1). System devices 120, 124, 126, 134, 138, 140, depicted with dashed lines, are placed in the ceiling, or preferably above a lacunaria, with respect to their functions, while the system devices 122, 128, 130, 132, 136, 142, 144, 146, depicted with solid lines, are placed on or in the walls, e.g. in an installation box, or on equipment that they are to control.

Figure 2:
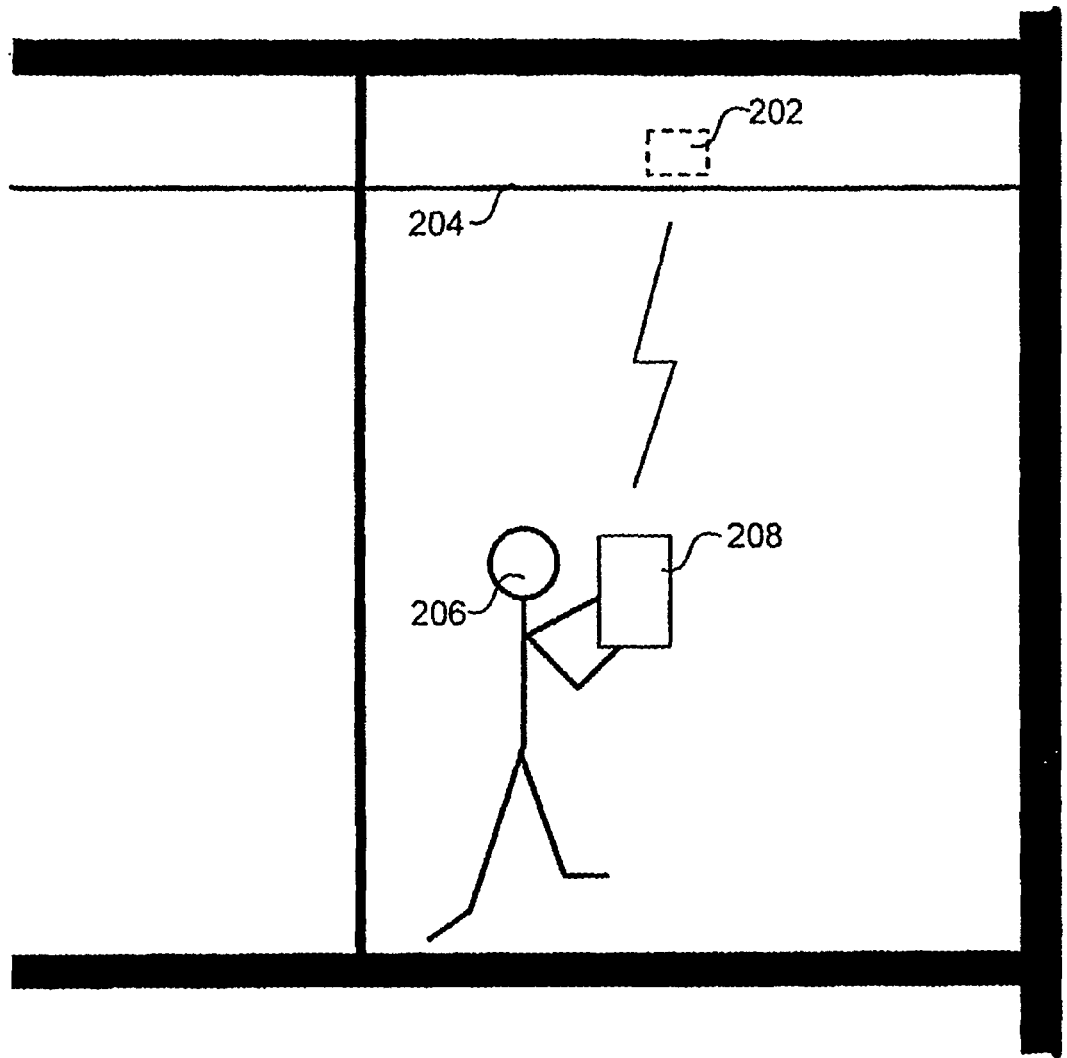
FIG. 2 shows an example of operation according to the present invention.

FIG. 2 shows operation according to one embodiment of the present invention in a building 200, where a system device 202 is placed above a lacunaria 204, i.e. in the plenum. An operator 206 identifies the system device 202 with an operator tool 208. The operator tool 208 sends a signal to the system device 202, which comprises a tag (not shown), which preferably comprises a transponder. The tag echoes a signal comprising a unique identity of the system device 202 to the operator tool 208. The operator tool 208 then accesses a system layout database (not shown) to receive detailed information on the system device. The operator tool 208 then maps the identity to an item of a layout database, which has been downloaded to the operator tool 208 from a system layout database (not shown) of the system. The operator tool 208 updates the database item of the system layout database, and preferably communicates the updated item to the layout database when appropriate. Alternatively, the layout database then creates a logical connection between the item of the layout database and an item of a system device database corresponding to the unique identity of the system device, and adds information from the item of the system device database to the item of the system layout database. The layout database and the system database can physically be in two or more databases, or in one common database. The processing can be performed in the operator tool, or in a computer in the facility management system, which preferably is holding the system layout database.

Figure 3:
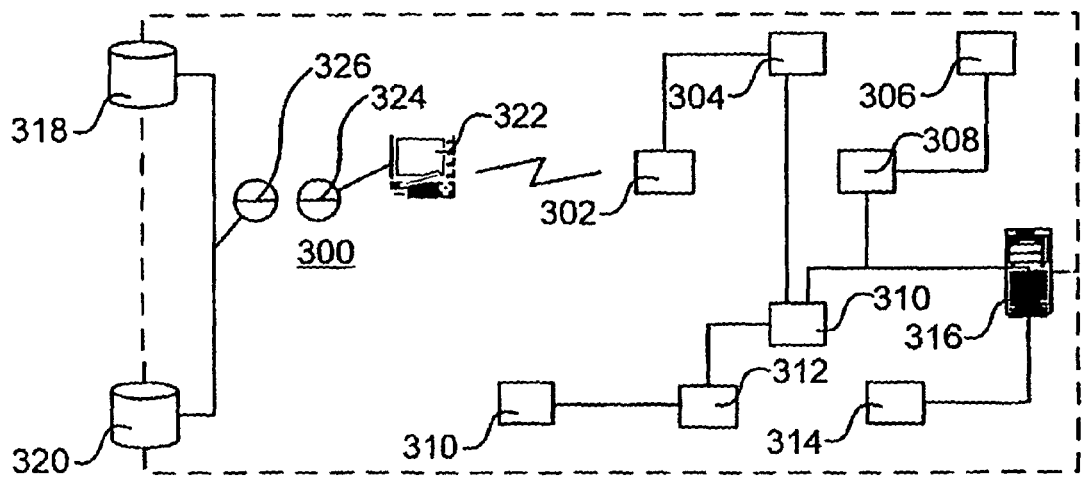
FIG. 3 schematically shows a system according to one embodiment of the present invention.

FIG. 3 schematically shows a system 300 according to one embodiment of the present invention comprising a plurality of system devices 302, 304, 306, 308, 310, 312, 314 connected in a configuration determined by the function of the system 300. The system devices 302, 304, 306, 308, 310, 312, 314 could be sensors, actuators, controllers, valves, power sources, etc. The system 300 further comprises a system monitoring device 316 connected to the system devices 302, 304, 306, 308, 310, 312, 314. The system monitoring device 316 perform monitoring, control and maneuver of system devices, etc. The system monitoring device 316 is preferably also connected to a system layout database 318 and a system device database 320, at least occasionally. The system also comprises an operator tool 322, which comprises a communication interface 324 to communicate with the system layout database 318 via a communication interface 326 of the system layout database 318 and the system device database 320. The system components will be described below.

Figure 4:
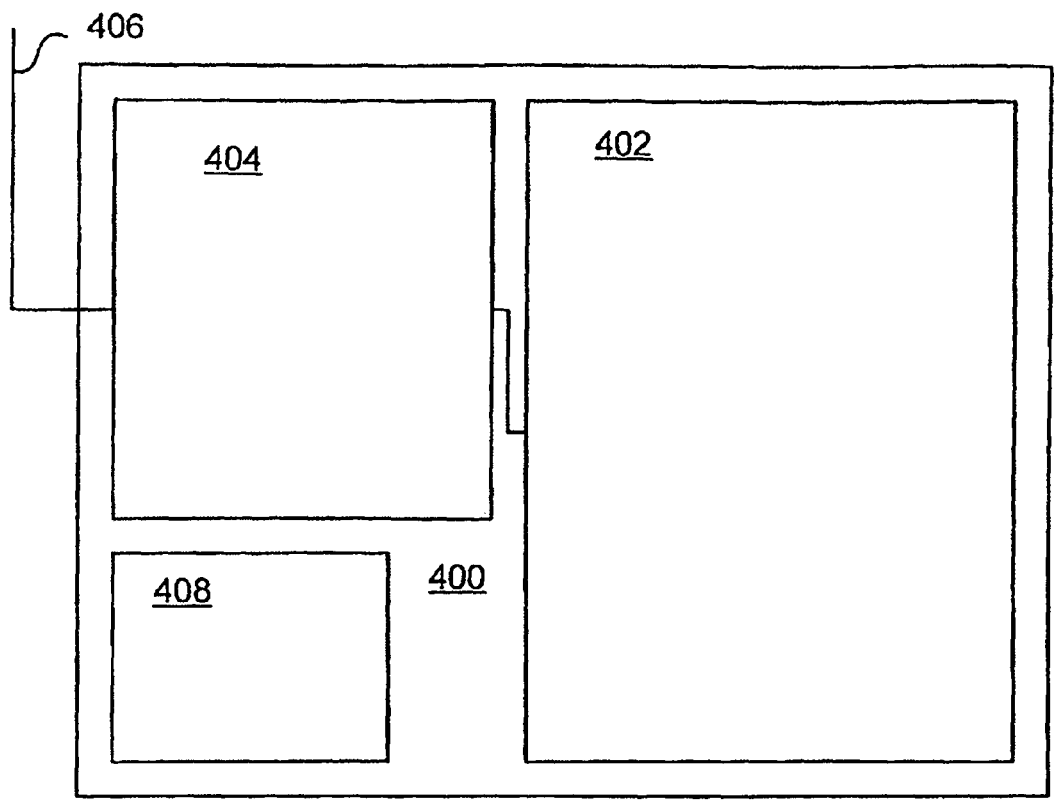
FIG. 4 schematically shows a system device according to one embodiment of the present invention.

FIG. 4 schematically shows a general system device 400 according to one embodiment of the present invention. The system device comprises an operating means 402 for performing a function in the system. For example, the function can be determining temperature, humidity, barometric pressure, light, and/or wind, or any other parameter needed by the system, or controlling power supply, fluid flow, automatic opening/closing of doors or windows, operation of awnings, sunblinds, sunshades, projection screens, or other equipment. The operating means 402 is preferably electrically and/or mechanically operated. The system device also comprises a circuitry 404 connected to the operating means 402 and to the system via a wired or wireless connection 406. The circuitry 404 can be anything from a simple connecting means to an advanced processing unit with communication interfaces (not shown) towards the system and the operating means 402. The system device 400 can also comprise a user interface (not shown) comprising e.g. an input means (not shown) and a display means (not shown). Further, the system device comprises a tag 408 for uniquely identifying the system device 400. The tag can be a radio device, e.g. a radio frequency identification (RFID), a Bluetooth device, an optical tranceiver, e.g. for infrared light such as infrared data association (IRDA), other infra red communications devices, or light scanned devices, e.g. bar codes, magnetic tags, acoustic tags, or any other electronic short range communication interface.

Radio Frequency Identification (RFID), like barcode, magnetic stripe, voice data entry and other automatic identification technologies, is an information acquisition technology. RFID consists of a sensing device which transmits a radio-frequency signal to a specially designed tag—the Transponder—, which responds with another radio message.

The RFID system consists of three basic elements: the active or passive transponders (the tag) and the reader. The reader emits a radio frequency electromagnetic field via an antenna. When a transponder passes within range, it is excited, causing it to transmit its data back to the reader. Transmission and reception occurs simultaneously. This makes for a very short read time. Further, the transponder may work without being installed, where the transponder may comprise a battery if an active transponder. A passive transponder will normally work without a battery.

The primary benefits of RFID are the elimination of clerical errors in recording data; faster data collection; and a reduction in labour and paperwork required to process data.

The advantages of RFID over other ID technologies (such as barcode and magnetic stripe) include: reliable operation in a harsh environment (in wet, dusty, dirty conditions; corrosive environments; applications where vibration and shocks are considerations) non-contact operation freedom from line-of-sight constraints (transponders can be read irrespective of orientation; through paint, even through non-ferrous solids).

Figure 5:
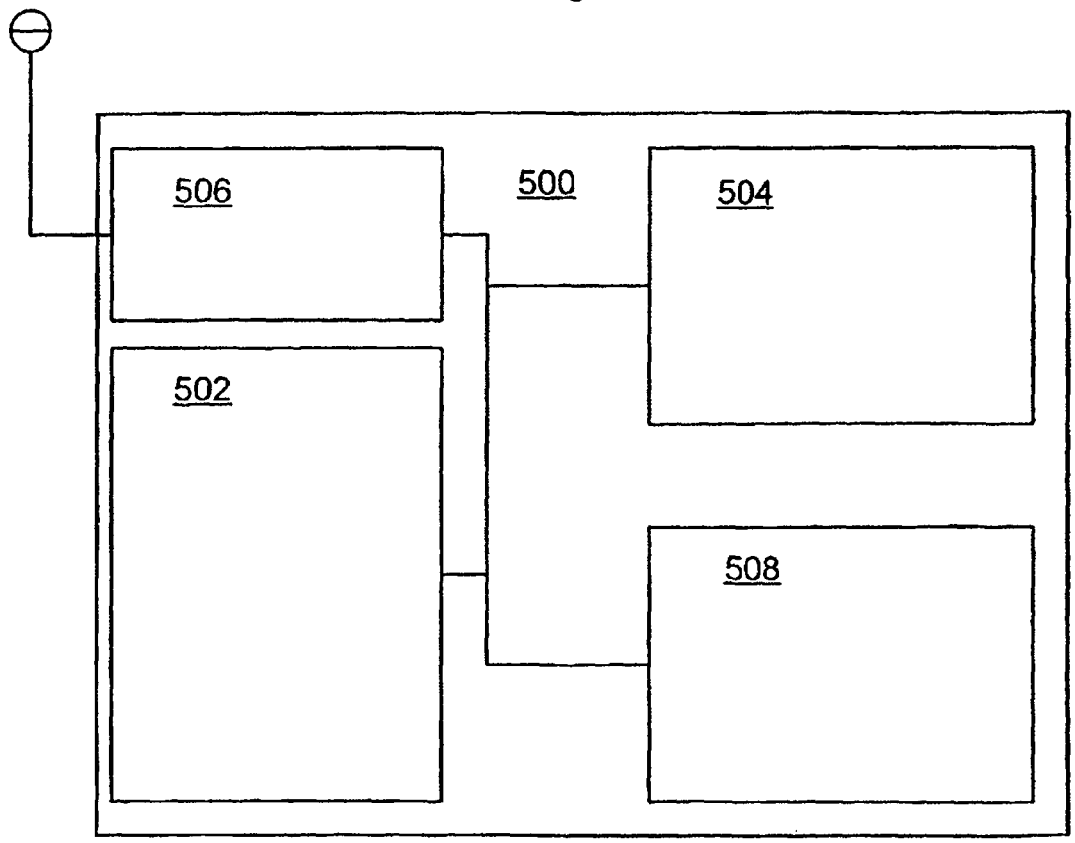
FIG. 5 schematically shows an operator tool according to one embodiment of the present invention.

FIG. 5 schematically shows an operator tool 500 according to one embodiment of the present invention, comprising a central processing unit (CPU) 502, a user interface (UI) 504, a communication interface 506, and a tag reader 508. The communication interface 506, the UI 504, and the tag reader 508 are connected to and controlled by the CPU 502.

The UI 504 can comprise an input means (not shown) and a display means (not shown) for enabling an operator to operate the operator tool 500. The input means can comprise a keyboard, a keypad, and/or any other known input means such as track ball, joystick, etc. The input means can also be integrated in the display means as a touch sensitive display. The display means can be a number of seven-segment-display, an LCD screen or other type of viewing screen.

The communication interface 506 can be enabled to communicate to the system by wire or wireless. The wire communication can be over a computer network, on a dedicated line, over a telephone network, or a direct connection to the system. The wireless communication can be over a dedicated radio network, a mobile communication network, a wireless datacommunication network, e.g. wireless local area network (WLAN), or a short link radio network, e.g. Bluetooth. The communication interface 506 is used to interchange information with the system continuously, or occasionally.

The tag reader 508 can be a radio device, e.g. a Bluetooth device, an optical tranceiver, e.g. for infrared light such as infrared data association (IRDA), a reader for radio frequency identification (RFID), or any other electronic short range communication interface.

Figure 6:
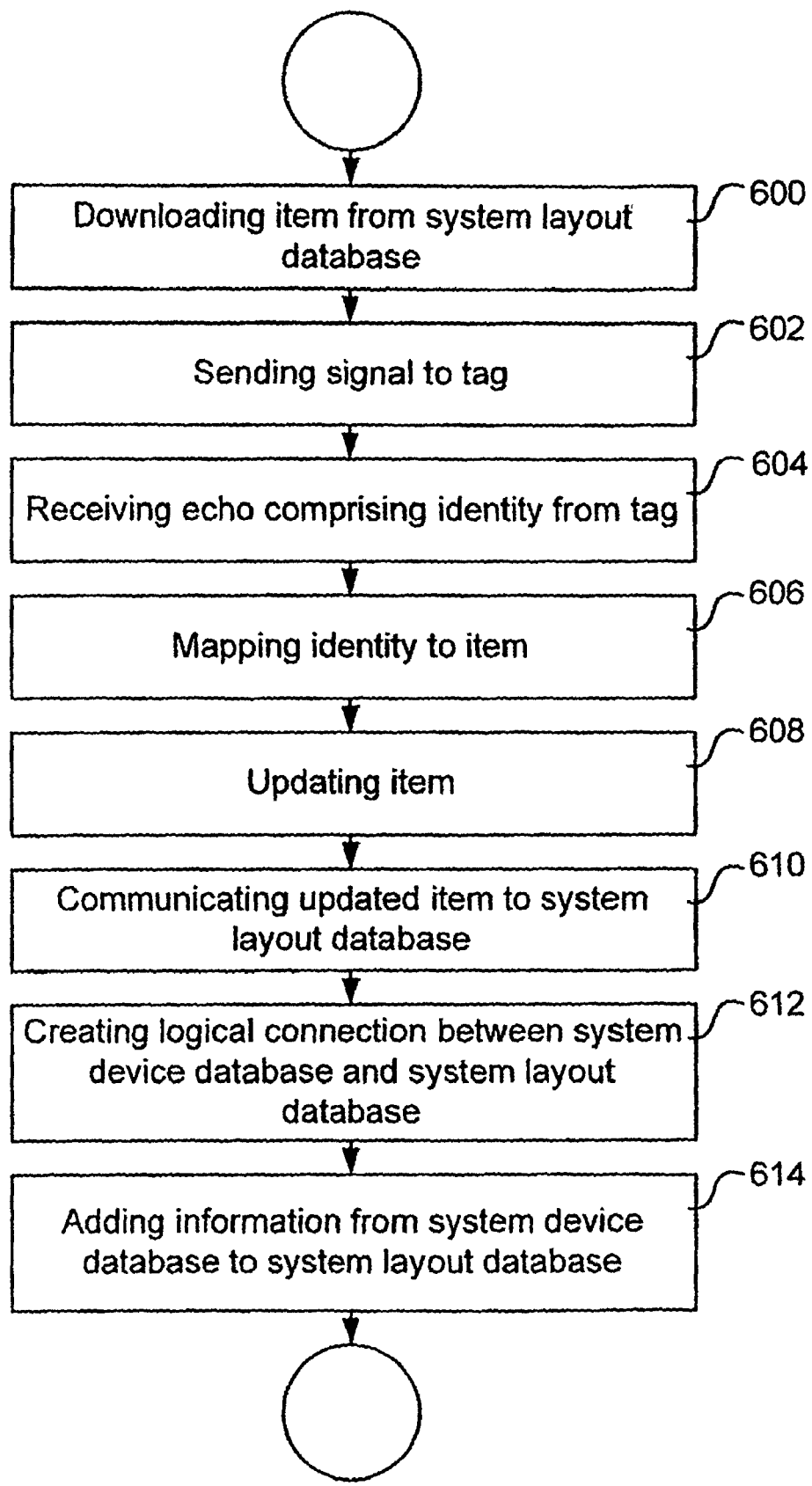
FIG. 6 is a flow chart of a method according to one embodiment of the present invention.

FIG. 6 shows an operating method according to one embodiment of the present invention. The steps 600-614 are depicted in sequence. However, the steps are to be performed in any order, repeatedly, and/or in parallel, as is common in some data processing systems. The only constraint is that information to be processed is available at the time of processing. The processing technique is commonly referred to as realtime processing. One or more items are downloaded from a system layout database to an operator tool in a downloading step 600. Items to be downloaded are those related to a building, parts of a building, or the facility that is to be installed, checked, updated, or otherwise managed by an operator. When the operator is in the vicinity of a system device that is to be accessed, a signal is sent to a tag of the system device in a sending step 602. The tag echoes a response signal comprising a unique identity of the system device which is received by a tag reader in a reception step 604. The operator tool then maps the received identity to a corresponding downloaded database item in a mapping step 606 and then updates the database item with the received identity of the system device in an updating step 608. The operator tool communicates the updated database item to the system layout database via a communication interface, either immediately or at a later occasion, in a communication step 610. The system layout database creates a logical connection between a system device database comprising data on all system devices and the received updated system layout database item in a logical connection creation step 612 and adds information from the system device database to the received updated item of the system layout database in an information adding step 614. Thus, updated, complete, and correct information about the system is maintained in the system layout database after installing, checking, updating, or otherwise managing the system by an operator.

Figure 7:
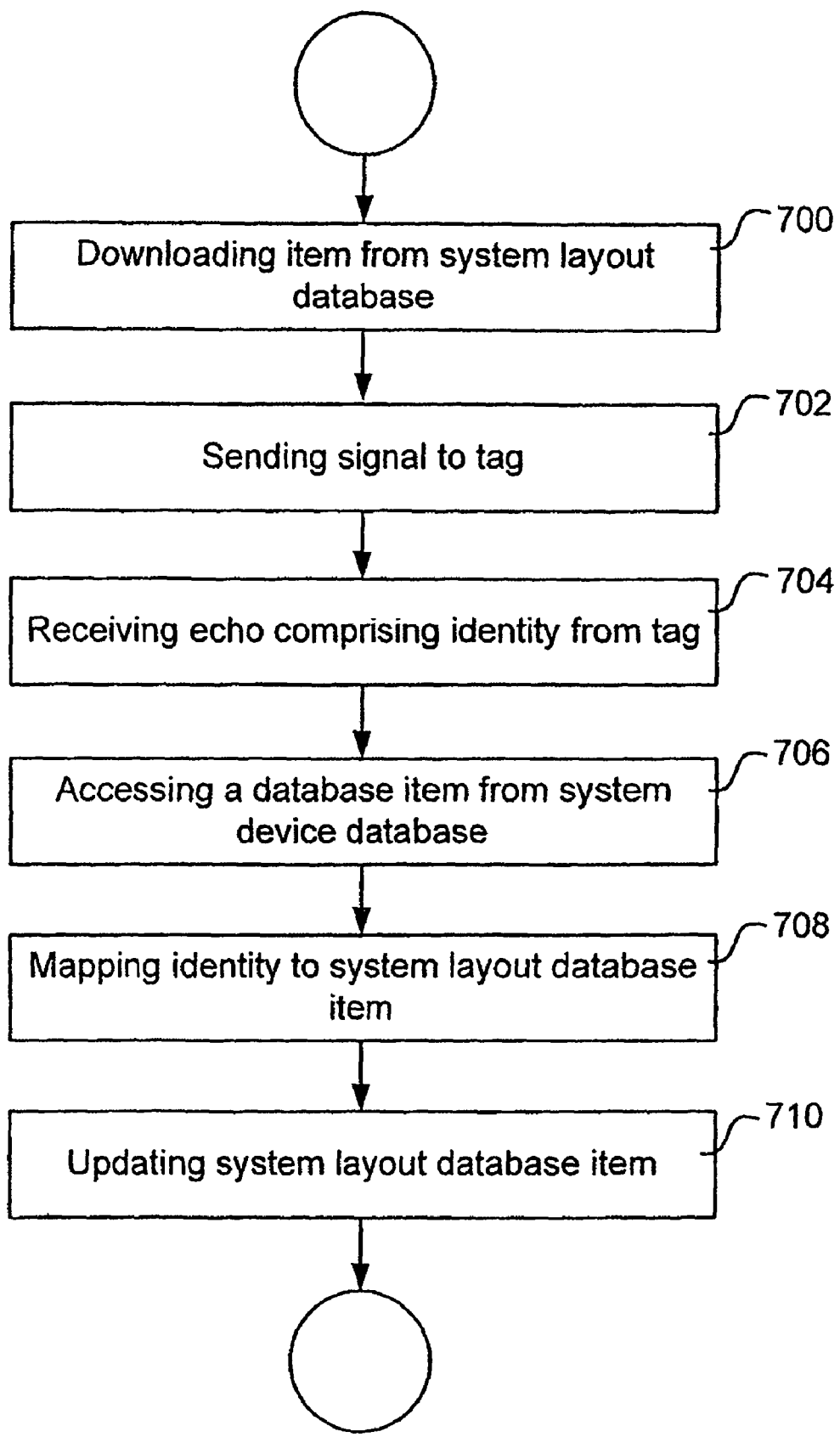
FIG. 7 is a flow chart of a method according to one embodiment of the present invention.

FIG. 7 shows an operating method according to one embodiment of the present invention. The steps 700-710 are depicted in sequence. However, the steps are to be performed in any order, repeatedly, and/or in parallel, as is common in some data processing systems. The only constraint is that information to be processed is available at the time of processing. The processing technique is commonly referred to as realtime processing. One or more items are downloaded from a system layout database to an operator tool in a downloading step 700. Items to be downloaded are those related to a building, parts of a building, or the facility that is to be installed, checked, updated, or otherwise managed by an operator. When the operator is in the vicinity of a system device that is to be accessed, a signal is sent to a tag of the system device in a sending step 702. The tag echoes a response signal comprising a unique identity of the system device which is received by a tag reader of the operator tool in a reception step 704. The operator tool accesses a database item from a system device database in step 706 to get information on the system device. The operator tool then maps the received identity to the corresponding downloaded database item in a mapping step 708 and then updates the system layout database item with the received identity of the system device, and preferably information on the system device, in an updating step 710. The operator tool can communicate the updated system layout database item to the system layout database via a communication interface, either immediately or at a later occasion. Thus, updated, complete, and correct information about the system is maintained in the system layout database after installing, checking, updating, or otherwise managing the system by an operator.

Figure 8:
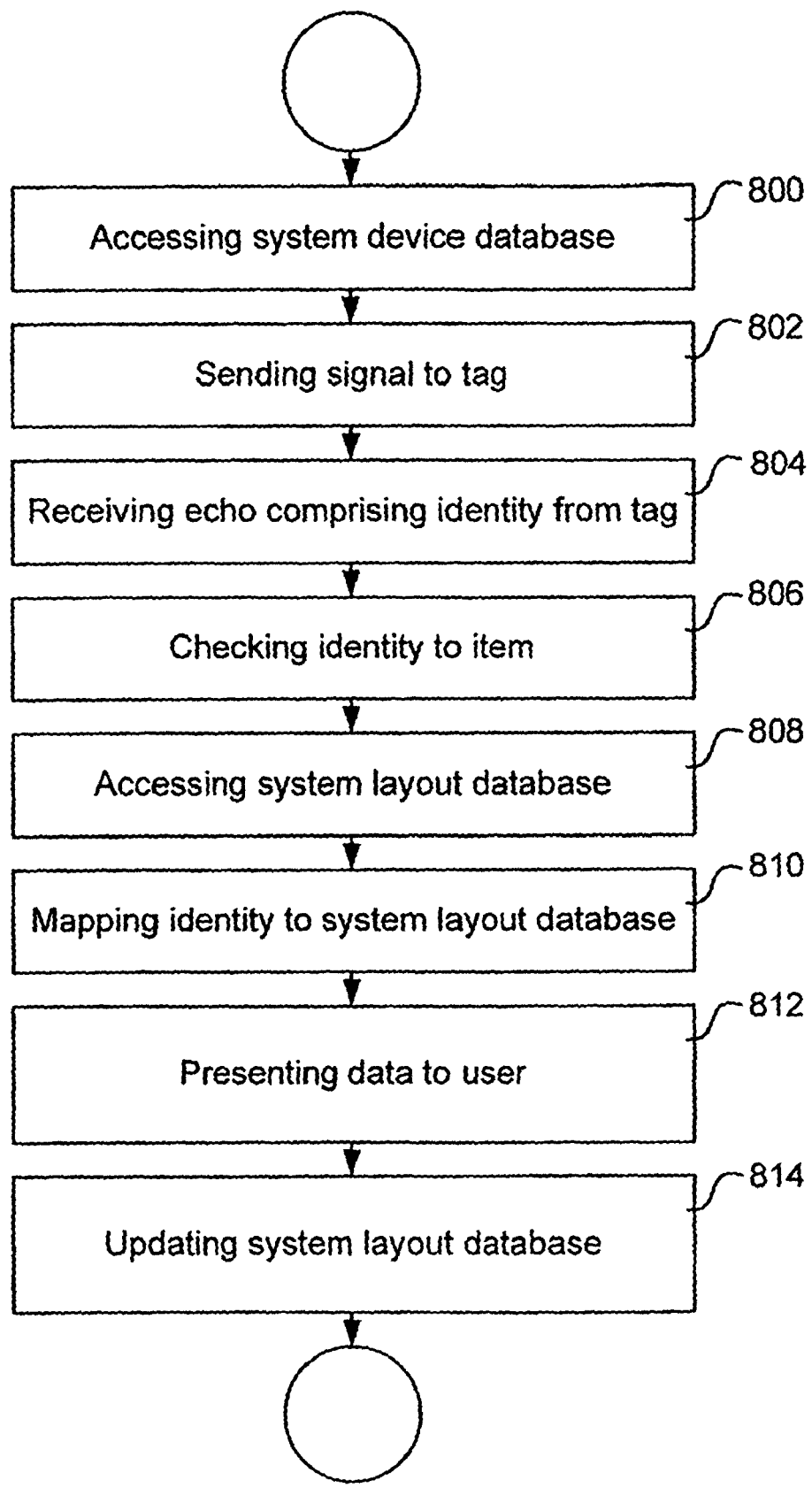
FIG. 8 is a flow chart of a method according to one embodiment of the present invention.

FIG. 8 is a flow chart illustrating a method according to one embodiment of the present invention. The steps 800-814 are depicted in sequence. However, the steps are to be performed in any order, repeatedly, and/or in parallel, as is common in some data processing systems. The only constraint is that information to be processed is available at the time of processing. The processing technique is commonly referred to as realtime processing. In a system device database step 800 information on one or more system devices are acquired from a system device database. In a signal sending step 802, a signal is sent from an operator tool to a tag of a system device. In a echo reception step 804, an echo is received from the tag. The echo signal comprises an identity of the tag. In a checking step 806, the identity is checked towards an identity of a database item, either from the system layout database or the system device database, to make sure that the correct system device is observed. In a system layout database accessing step 808, a system layout database is accessed to acquire e.g. location information on the system device. In a identity mapping step 810, the identity of the system device is mapped to the system layout database. This can be the case when a new system device is mounted, or an old one is replaced with a new one. In a data presenting step 812, data about the actual system device is presented to a user through a user interface of the operator tool. In a system layout database updating step 814, an item of the system layout database corresponding to the actual system device or location is updated. The update can comprise the identity of, location of, and/or information on the system device.

The system device database is preferably created at the system delivery, i.e. delivery of system devices from one or more system device providers at installation of the system, or manufacturing of system devices. Each item of the system device database comprises the identity of the system device, which identity is given by the ID tag of the system device. This provides the advantage that the identity of each system device is unique, although it is uniform, i.e. it does not matter whether the system device comes from different vendors, sub-contractors, suppliers, etc., or from the system deliverer. This is possible since the tag is functionally independent on other features of the system device. It is only physically located on or in the system device. The identity can be characterised by a number or a sequence of symbols. Further, the system device database item comprises data on the system device. The data can comprise manufacturer's number on the device, e.g. serial no., batch no., etc., model name and/or number, hardware version, software version, application or configuration identity, and/or user interface aids, such as images, drawings, documents, manuals, data sheets, etc. A particular example of information that can be comprised in the system device database is neuron ID in a LonWorks technology network, a hardware ID for ethernet devices, or any ID information related to a communication system associated with the system device. Further, the system device database can comprise information on testing of the device, such as test result data, test type, calibration information, etc.

The operator tool is able to access the system device database, either directly, or via the system layout database, at least occasionally. For example, the system device database can be accessed prior a facility management operation, where relevant parts of the system device database is downloaded to the operator tool, or it can be accessed via a telecom or datacom network during the facility management operation.

The user of the operator tool can for example filter out a certain product type that is to be maintained, checked, or fixed in any way, and thus get relevant information on the product. Simultaneously, the operator tool can access the system layout database to be able to find the system devices in the facility. Then, the user can locate the actual system device(s) and for example check if it/they hold the right software version.

Similarly, the user of the operator tool can for example filter out a system device located at a certain location, e.g. a room or apartment of a facility, that is to be maintained, checked, or fixed in any way, from the system layout database. Simultaneously, the operator tool can access the system device database to be able to find relevant information on the system devices in the facility. Then, the user can locate the actual system device(s) and for example check if it/they hold the right configuration.

Another example is that it has been found that a certain system device or batch of system devices are burdened with an error, e.g. in the software. The user can then easily locate the devices by using the operator tool and then check each device for example if the software has been updated, since all information is available, and being able to readily locate the devices, although they may be at places that are not that easy to access.

There is a large number of examples and situations where the features of the present invention strongly facilitates the management of a facility. Only some of them are demonstrated above. It is to be noted that the features of the present invention is relevant not only for service and build-up of a facility management system at the particular facility site, but also for distribution and stock keeping of system devices for the facility management system, where the tags and databases are used to keep track of system devices.

The invention claimed is:

1. A building control system for facility management of a building, comprising:
   a plurality of building control devices each provided with an identity tag uniquely identifying each one of said plurality of building control devices, respectively, the building control devices each being respectively associated with at least one function performable in the building for maintenance of the building;
   a system layout database comprising facility layout data of said building control system including intentional installation positions of said plurality of building control devices in said building;
   a building control device database comprising corresponding data and an identity for each one of said plurality of building control devices, respectively; and
   an operator tool enabled to communicate with said system layout database and said building control device database, said operator tool comprising a tag reader enabled to read an identity from the identity tag of a corresponding one of said building control devices when being in the vicinity of one of said building control devices, wherein said operator tool is arranged to access data from said building control device database about said one of said building control devices, and include said read identity in an item of the system layout database, said item being related to said one of said building control devices.

2. The system according to claim 1, wherein said system layout database is enabled to communicate with said building control database.

3. The system according to claim 1, wherein said identity tag comprises a transponder for wireless communication with said tag reader of said operator tool.

4. The system according to claim 1, comprising means for determining actual positions of said building control devices for updating said system layout database.

5. The system according to claim 1, wherein at least one of said tags is a radio frequency identification (RFID) transponder.

6. The system according to claim 5, wherein said RFID transponder is re-programmable.

7. The system according to claim 5, wherein said RFID transponder is a passive transponder.

8. The system device according to claim 5, wherein said RFID transponder is an active transponder.

9. The system according to claim 1, wherein at least one of said tags is at least one of a Bluetooth device, an optical tranceiver, an infrared data association (IRDA) device, an infra red communications device, a light scanned device, a bar code, a magnetic device, an acoustic device, and any combination thereof.

10. An operator tool for facility management of a building control system, comprising:
    a communication interface for communication with a system layout database of a building control system for facility management of a building and a building control device database, said system layout database comprising facility layout data of said building control system including intentional installation positions of a plurality of building control devices in the building, said building control device database comprising corresponding data and an identity for each of said building control devices, respectively, each of said building control devices having an identity tag uniquely identifying said building control device, respectively, and each of said building control devices being respectively associated with at least one function performable in the building for maintenance of the building;
    a tag reader for reading an identity tag of a corresponding one of said building control devices; and
    a processing unit connected to said communication interface and said tag reader for processing items received via said communication interface in response to information received by said tag reader,
    wherein said operator tool is arranged to access data from said building control device database about said building control device and include said identity in an item of the system layout database, said item being related to said building control device.

11. The operator tool of claim 10, wherein said tag reader is a scanner for a radio frequency identification (RFID) transponder.

12. The operator tool of claim 11, wherein said scanner is enabled to write information to a RFID transponder.

13. The operator tool according to claim 10, wherein said tag reader is adapted to read at least one of a Bluetooth device, an optical tranceiver, an infrared data association (IRDA) device, an infrared communications device, a light scanned device, a bar code, a magnetic device, an acoustic device, and any combination thereof.

14. A method for managing a facility management system of a building for locating a building control device, comprising the steps of:

accessing a database item from a building control device database, said database item comprising data and an identity of a building control device, said building control device database comprising corresponding data and an identity for each of a plurality of said building control devices, respectively; and locating said building control device, said locating of said building control device comprising the steps of:
sending a signal from an operator tool to said building control device;
receiving an echo from said building control device, wherein said echo comprises a unique identity of said building control device from which the echo is transmitted;
mapping said identity contained in said received echo to a first database item of a system layout database, said system layout database comprising facility layout data of said building control system including intentional installation positions of said plurality of building control devices in said building; and
checking if said received identity contained in said received echo is equal to said identity contained in said accessed database item for said building control device.

15. The method according to claim 14, further comprising the step of accessing an item from said system layout database to said operator tool, wherein said item of said system layout database comprises location information on said building control device.

16. The method according to claim 14, further comprising the step of:
updating said first database item to include said identity contained in said receved echo.

17. The method according to claim 16, wherein said updating further comprises including said data from said system device database.

18. The method according to claim 14, further comprising presenting said data to a user.

19. A method for managing a facility management system of a building, comprising the steps of:
sending a signal from an operator tool to a building control device;
receiving an echo from said building control device, wherein said echo comprises a unique identity of said building control device;
accessing a database item from a building control device database, said building control device database comprising corresponding data and an identity for each of a plurality of said building control devices in the building, respectively, said accessed database item comprising data and the identity of said building control device, each of said building control devices being respectively associated with at least one function performable in the building for maintenance of the building;
mapping said identity to a first database item of a system layout database, said system layout database comprising facility layout data of said building control system including installation intentional positions of a plurality of building control devices in said building; and
updating said first database item to include said identity of said building control device in an item of said system layout database, said item being related to said building control device.

20. The method according to claim 19, wherein said updating further comprises including said data from said building control device database.

21. The method according to claim 19, further comprising the step of downloading an item from said system layout database to said operator tool, wherein said item of said system layout database comprises said first database item.

22. The method according to claim 19, further comprising the steps of:
communicating said updated first item to said system layout database;
creating a logical connection between said item of said system layout database and an item of said building control device database corresponding to said unique identity of said building control device; and
adding information from said item of said building control device database to said item of said system layout database.

23. The method according to claim 19, further comprising presenting said data to a user.

24. The system according to claim 2, wherein said identity tag comprises a transponder for wireless communication with said tag reader of said operator tool.

25. The system according to claim 6, wherein said RFID transponder is a passive transponder.

26. The system device according to claim 6, wherein said RFID transponder is an active transponder.

27. The method according to claim 15, further comprising the step of:
updating said first database item to include said identity contained in said receved echo.

28. The method according to claim 20, further comprising the step of downloading an item from said system layout database to said operator tool, wherein said item of said system layout database comprises said first database item.

29. The system according to claim 1, wherein the intentional installation positions of each corresponding one of the building control devices includes at least one of a position in the building in which the corresponding building control device is fixedly installed, and a position of a component located in the building on which the corresponding building control device is arranged.

30. The operator tool according to claim 10, wherein the intentional installation positions of each corresponding one of the building control devices includes at least one of a position in the building in which the corresponding building control device is fixedly installed, and a position of a component located in the building on which the corresponding building control device is arranged.

31. The method according to claim 14, wherein the intentional installation positions of each corresponding one of the building control devices includes at least one of a position in the building in which the corresponding building control device is fixedly installed, and a position of a component located in the building on which the corresponding building control device is arranged.

32. The method according to claim 19, wherein the intentional installation positions of each corresponding one of the building control devices includes at least one of a position in the building in which the corresponding building control device is fixedly installed, and a position of a component located in the building on which the corresponding building control device is arranged.

* * * * *